US012653151B1

(12) United States Patent
Gulbrandsen

(10) Patent No.: US 12,653,151 B1
(45) Date of Patent: Jun. 16, 2026

(54) PET WASHING APPARATUS

(71) Applicant: James Gulbrandsen, Murphysboro, TN
(US)

(72) Inventor: James Gulbrandsen, Murphysboro, TN
(US)

( * ) Notice: Subject to any disclaimer, the term of this
patent is extended or adjusted under 35
U.S.C. 154(b) by 0 days.

(21) Appl. No.: 19/059,555

(22) Filed: Feb. 21, 2025

(51) Int. Cl.
*A01K 13/00* (2006.01)

(52) U.S. Cl.
CPC ................................. *A01K 13/001* (2013.01)

(58) Field of Classification Search
CPC .... A01K 13/001; A61D 11/00; A61G 7/1003;
A47K 3/17
USPC ................................................ 119/603, 673
See application file for complete search history.

(56) References Cited

U.S. PATENT DOCUMENTS

| | | | | |
|---|---|---|---|---|
| 1,705,880 A | * | 3/1929 | Schoen | ..................... E03C 1/01 |
| | | | | 4/644 |
| 3,477,069 A | * | 11/1969 | Stiger | .................. A61G 7/1046 |
| | | | | 4/566.1 |
| 4,167,793 A | * | 9/1979 | Vago | ........................ A47K 3/06 |
| | | | | 4/562.1 |
| 8,689,740 B2 | | 4/2014 | Caldwell | |
| 9,820,469 B2 | | 11/2017 | Caldwell | |
| 10,779,511 B1 | * | 9/2020 | Sterling | .................. B08B 3/026 |
| 2007/0039559 A1 | * | 2/2007 | Foster | .................. A01K 13/001 |
| | | | | 119/676 |
| 2007/0079766 A1 | * | 4/2007 | Park | ........................ A61D 11/00 |
| | | | | 119/674 |

| | | | | |
|---|---|---|---|---|
| 2007/0095301 A1 | * | 5/2007 | Boylan | ................ A01K 13/001 |
| | | | | 119/676 |
| 2010/0236838 A1 | * | 9/2010 | Shrak | ...................... A47K 3/024 |
| | | | | 177/1 |
| 2011/0017147 A1 | * | 1/2011 | Petruzzi | ............... A01K 13/001 |
| | | | | 119/671 |
| 2017/0094939 A1 | * | 4/2017 | Wright | .................. A01K 13/001 |
| 2020/0406804 A1 | * | 12/2020 | Jarvis | ........................ B60P 1/60 |
| 2023/0122984 A1 | | 4/2023 | Nachtigall-Fournier | |
| 2023/0189758 A1 | * | 6/2023 | Zhou | ..................... A01K 13/001 |
| | | | | 119/673 |
| 2023/0263134 A1 | * | 8/2023 | Parker | .................. A01K 13/001 |
| | | | | 119/608 |
| 2024/0306855 A1 | * | 9/2024 | McIntosh | ............... A47K 3/164 |

FOREIGN PATENT DOCUMENTS

| | | | | |
|---|---|---|---|---|
| CN | 105028227 | 11/2015 | | |
| CN | 107018920 | 8/2017 | | |
| CN | 107149432 A | * 9/2017 | ............... A47K 3/16 |
| CN | 113796332 | 12/2021 | | |
| FR | 2515500 A1 | * 5/1983 | ........... A61G 7/1003 |

* cited by examiner

*Primary Examiner* — Kimberly S Berona
*Assistant Examiner* — Erica Michelle Huebner

(57) ABSTRACT

A pet washing apparatus for washing a pet such as a dog or
a cat includes a wash tub which defines a basin for contain-
ing the pet, water, and cleaning substances such as soap. A
spray assembly is mounted to the wash tub and comprises a
nozzle oriented to direct water into the basin. A water supply
may fluidly couple to the spray assembly, and a water valve
is provided which selectively permits water from the water
supply to move to the spray assembly. A drying assembly is
configured to move air into the basin when activated to dry
the pet. A processor operates the water valve and the drying
assembly.

14 Claims, 12 Drawing Sheets

PET WASHING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pet wash apparatuses and more particularly pertains to a new pet wash apparatus for washing a pet such as a dog or a cat.

(2) Description of Related Art Including Information Disclosed Under 37 CFR 1.97 and 1.98

The prior art relates to pet wash apparatuses which use a card reader or other payment collection device to permit users to purchase use of the pet wash apparatus, water spraying components for wetting the pet, and drying components for drying the pet. However, the prior art fails to describe such an apparatus which includes a wash tub which defines a pet-holding basin that has an open top during use, a spray assembly mounted in the wash tub, a drying assembly mounted in the wash tub, and lifting means for a platform in the wash tub and the entire wash tub itself.

BRIEF SUMMARY OF THE INVENTION

An embodiment of the disclosure meets the needs presented above by generally comprising a wash tub comprises a bottom wall and a perimeter wall. The perimeter wall is coupled to and extends upwardly from the bottom wall. The wash tub defines a basin surrounded by the bottom wall and the perimeter wall. A spray assembly is mounted to the wash tub on an interior side of the perimeter wall of the wash tub. The spray assembly comprises a nozzle oriented to dispense water into the basin of the wash tub. A water inlet tube is fluidly coupled to the spray assembly and is configured to fluidly couple to a water supply. A processor is mounted to the wash tub, which operates a water valve and a drying assembly. The water valve is mounted to the water inlet tube and is movable via the processor to selectively permit water through the water valve. The drying assembly is mounted to the wash tub adjacent to the basin of the wash tub and is configured to urge air to flow into the basin of the wash tub when the drying assembly is activated by the processor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
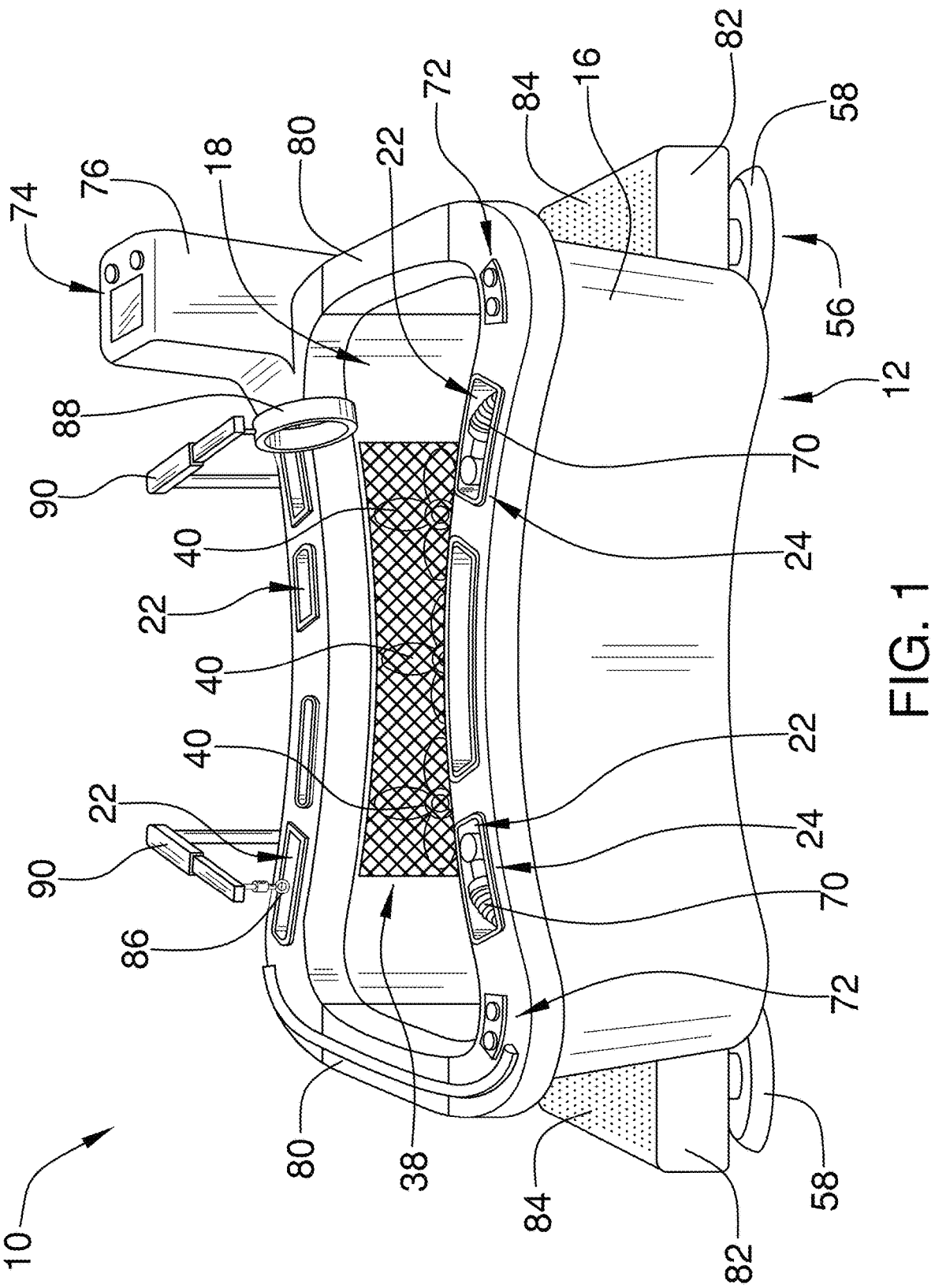
FIG. 1 is a top front perspective view of a pet washing apparatus according to an embodiment of the disclosure.
Figure 2:
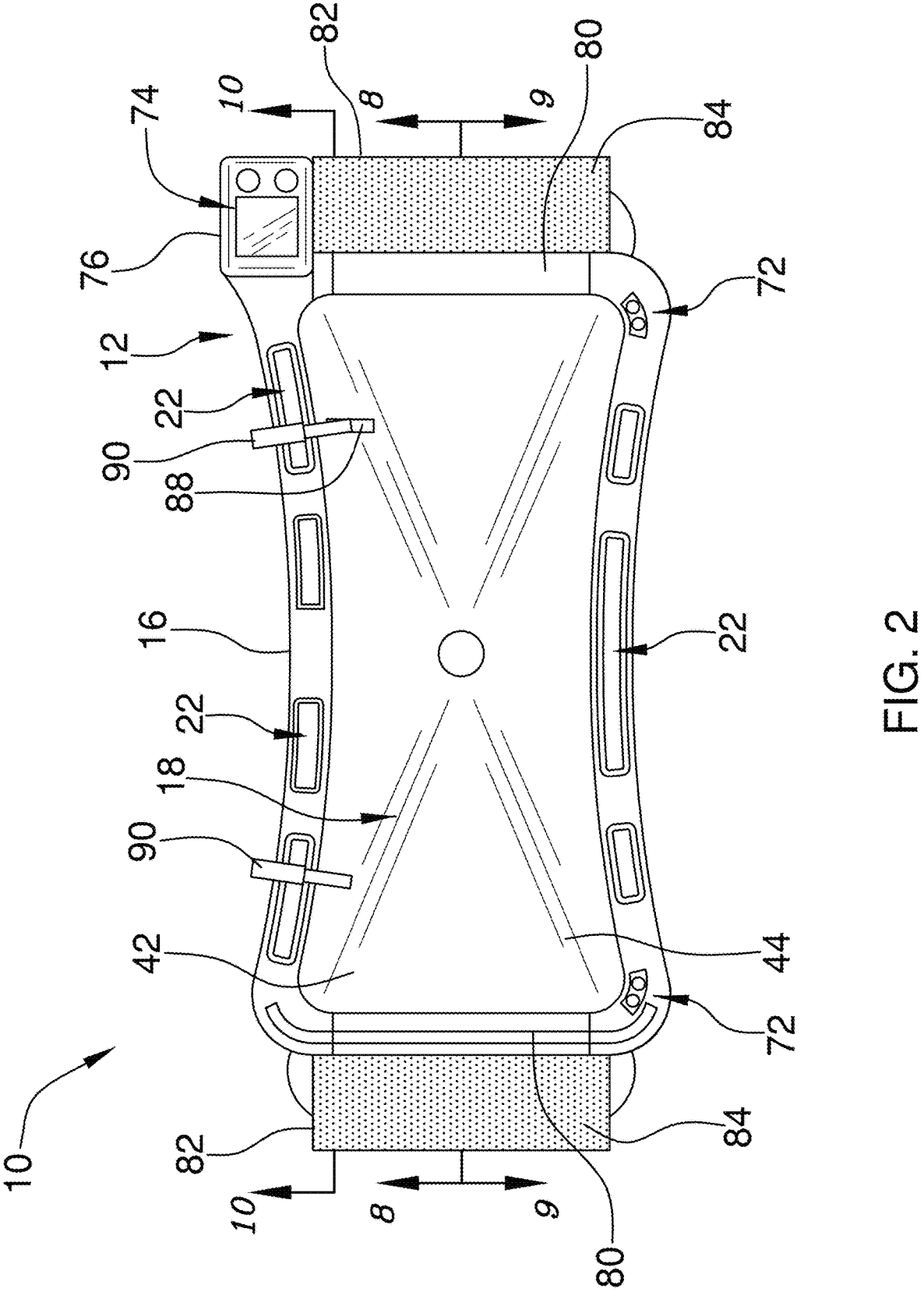
FIG. 2 is a top view of an embodiment of the disclosure in which a pair of doors on a wash basin are closed.
Figure 3:
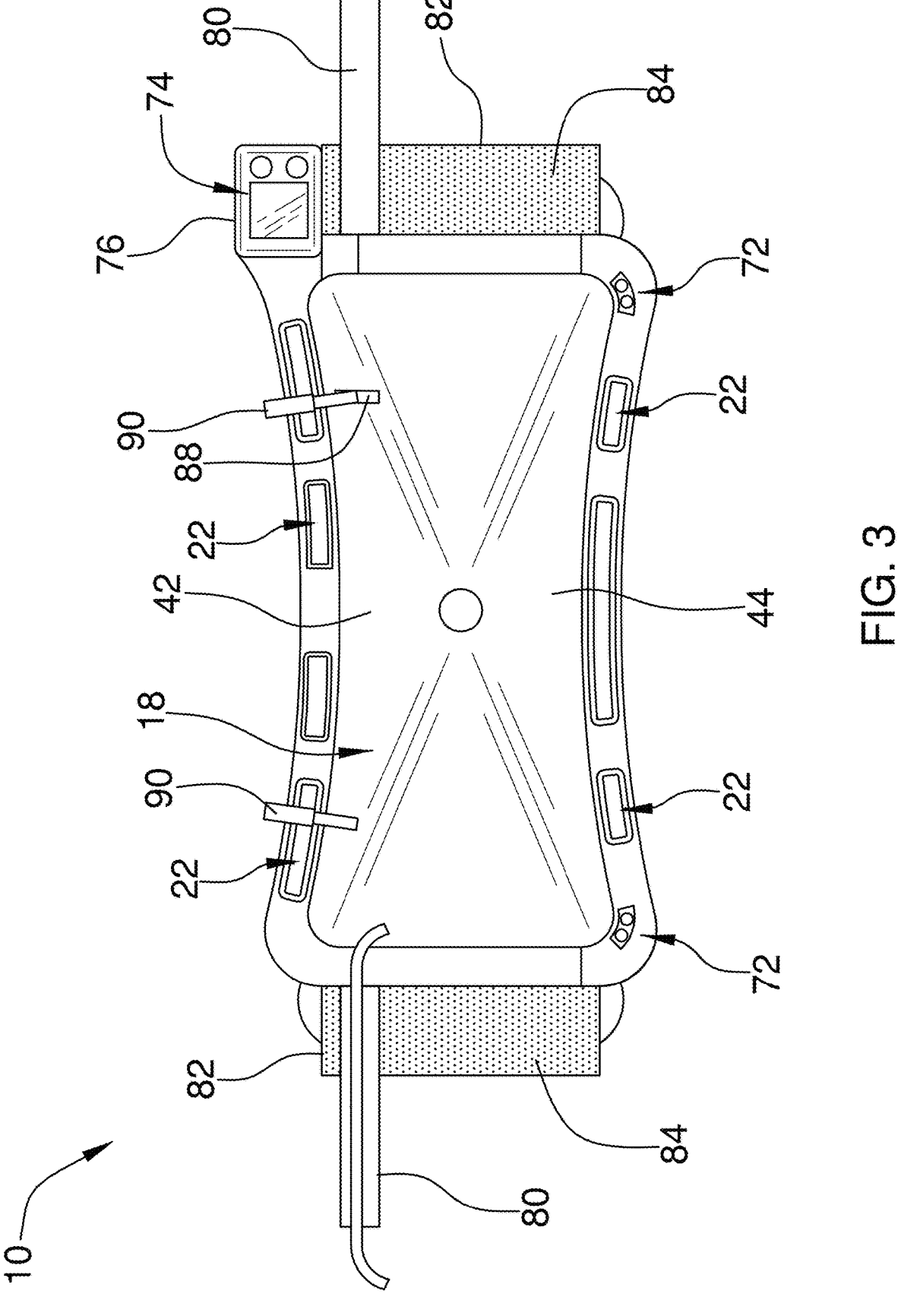
FIG. 3 is a top view of an embodiment of the disclosure in which a pair of doors on a wash basin are open.
Figure 4:
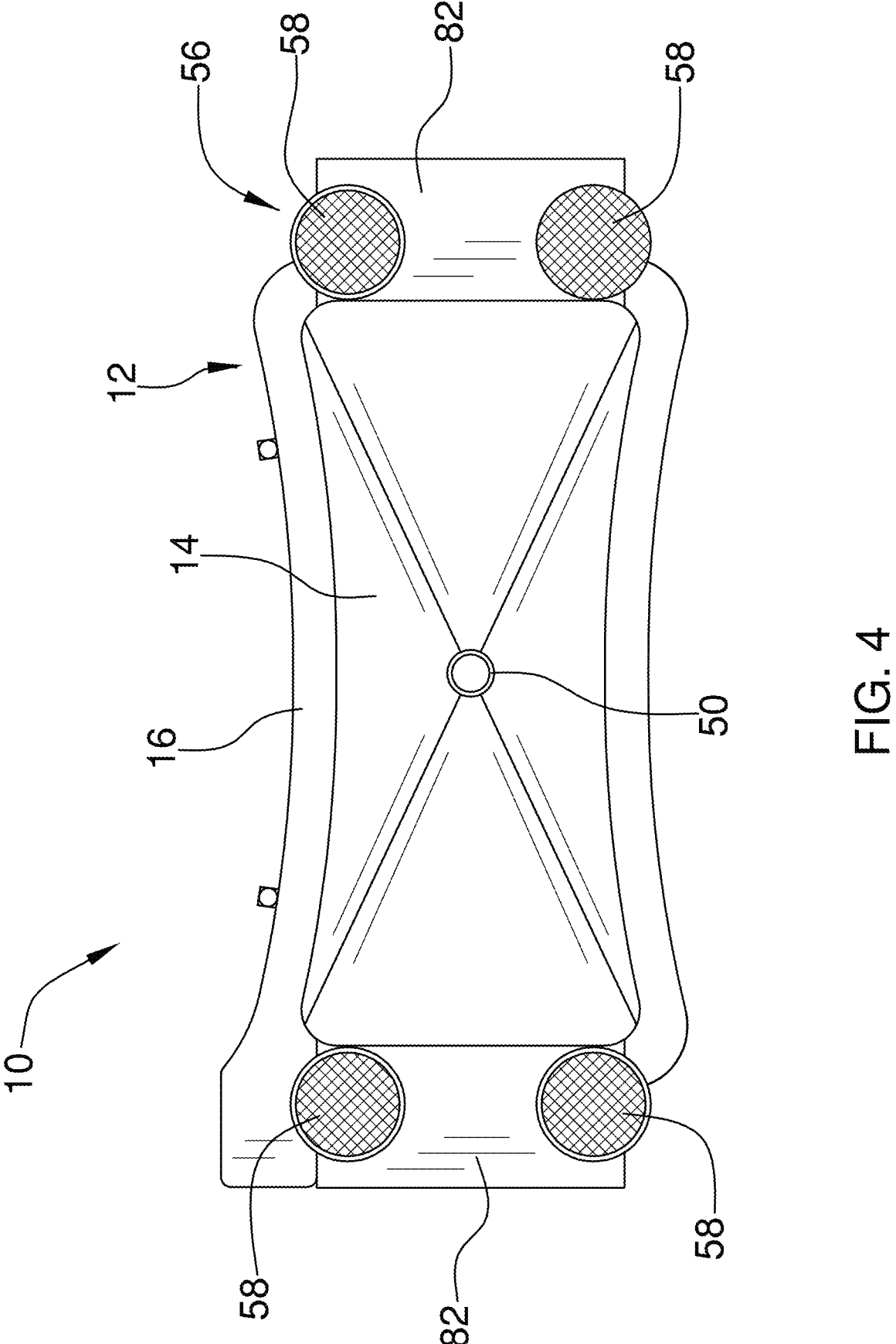
FIG. 4 is a bottom view of an embodiment of the disclosure.
Figure 5:
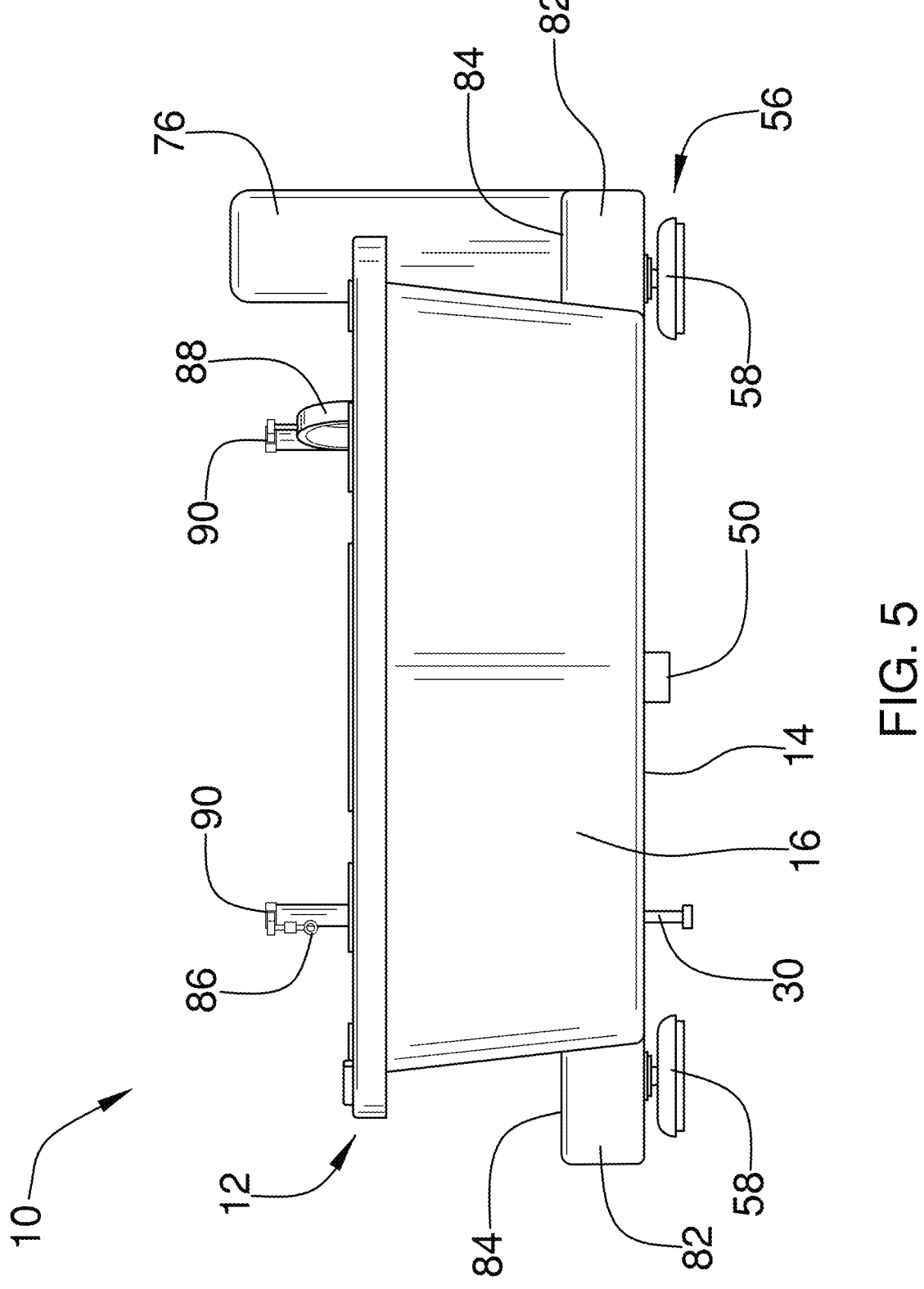
FIG. 5 is a front view of an embodiment of the disclosure.
Figures 6, 7:
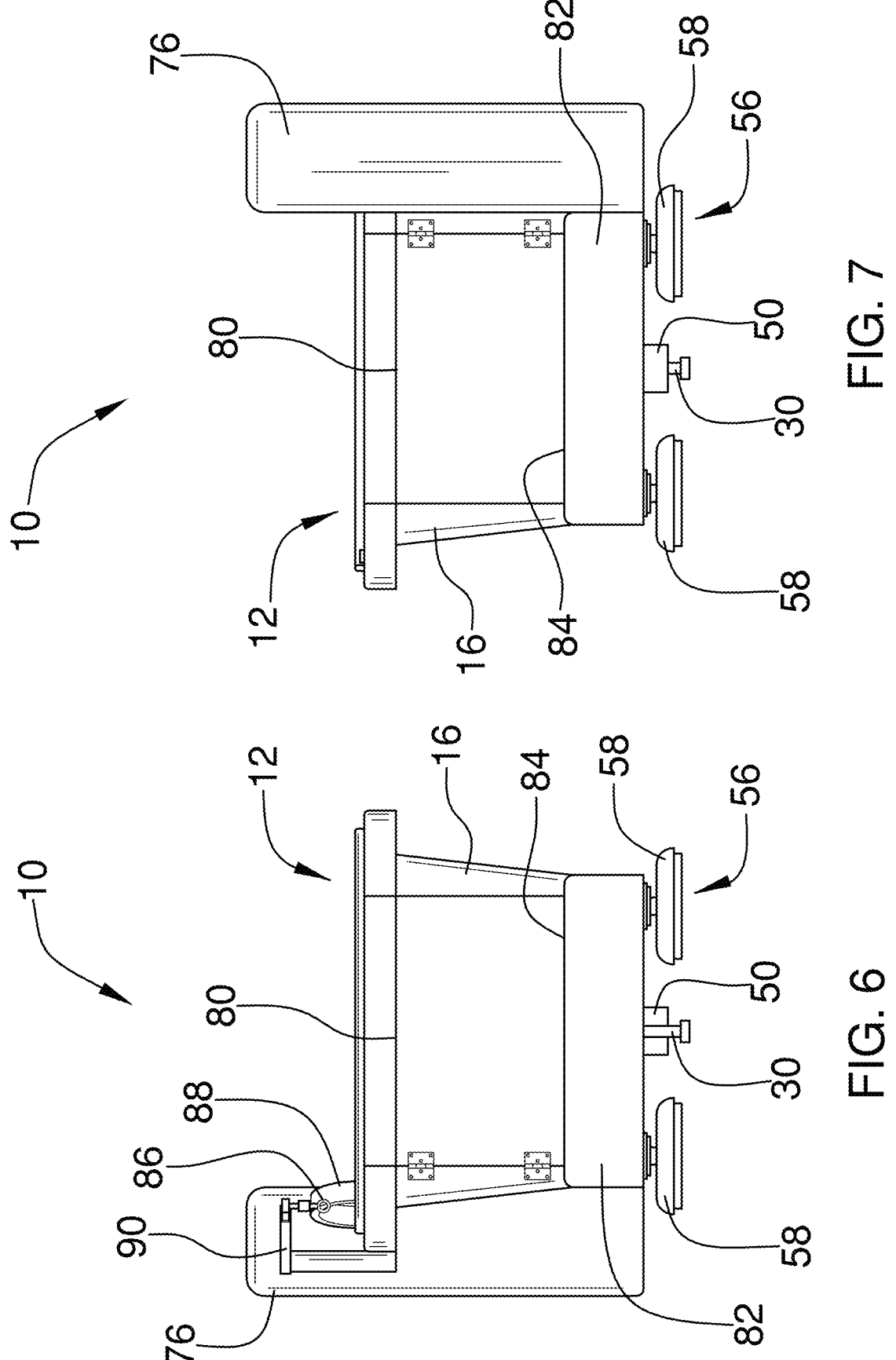
FIG. 6 is a first side view of an embodiment of the disclosure.
FIG. 7 is a second side view of an embodiment of the disclosure.
Figure 8:
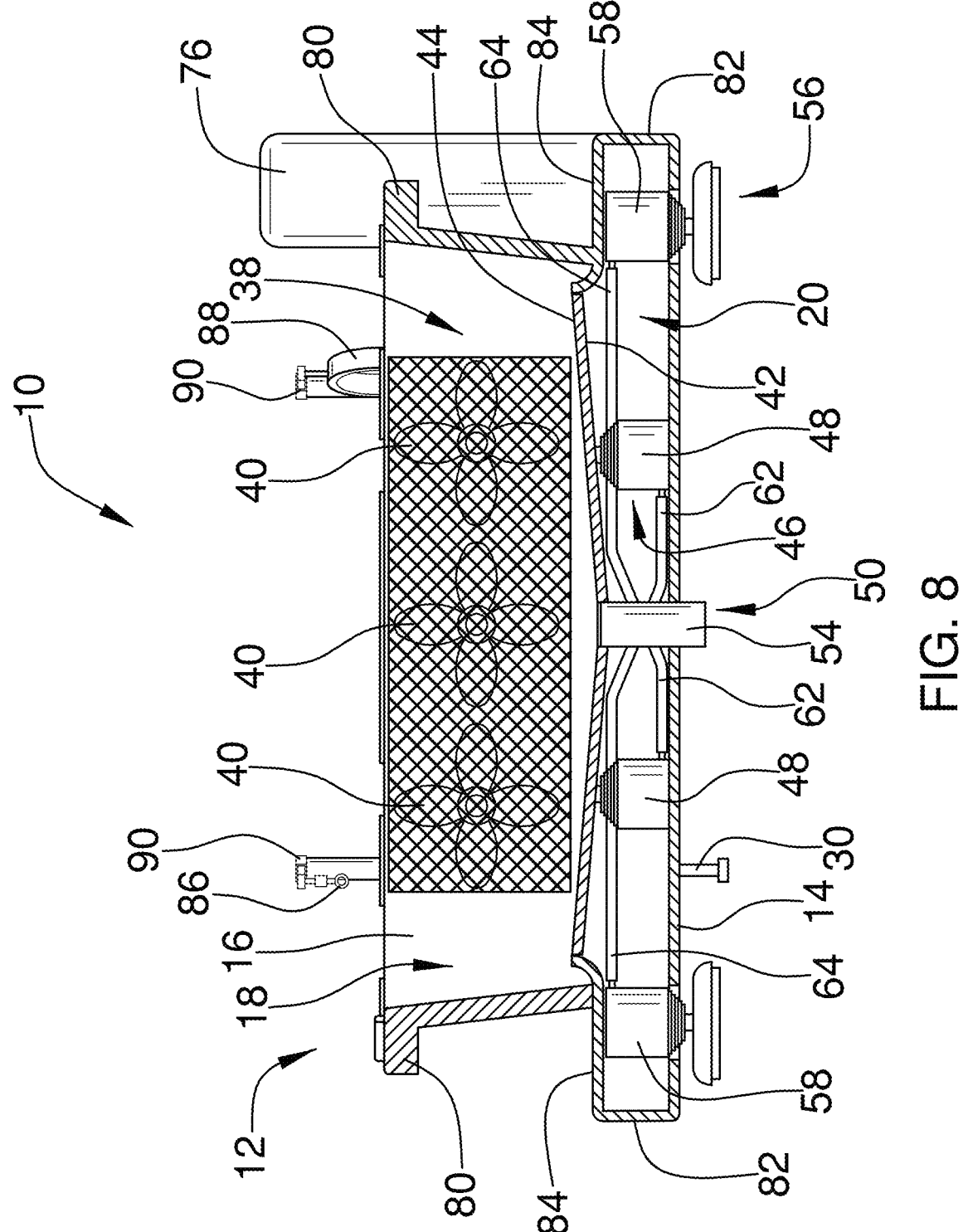
FIG. 8 is a cross-sectional view of an embodiment of the disclosure taken from Line 8-8 in FIG. 2.
Figure 9:
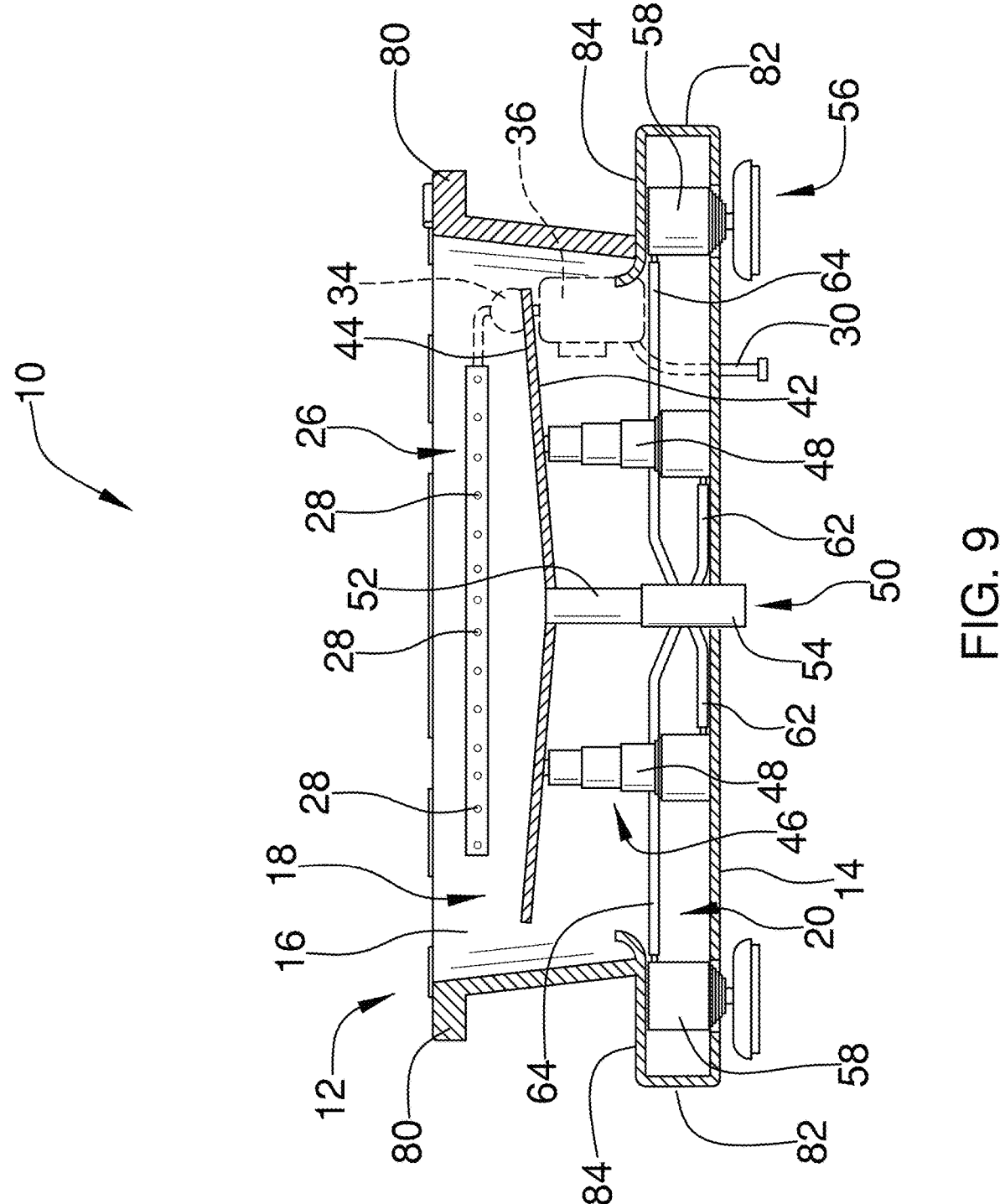
FIG. 9 is a cross-sectional view of an embodiment of the disclosure taken from Line 9-9 in FIG. 2.
Figure 10:
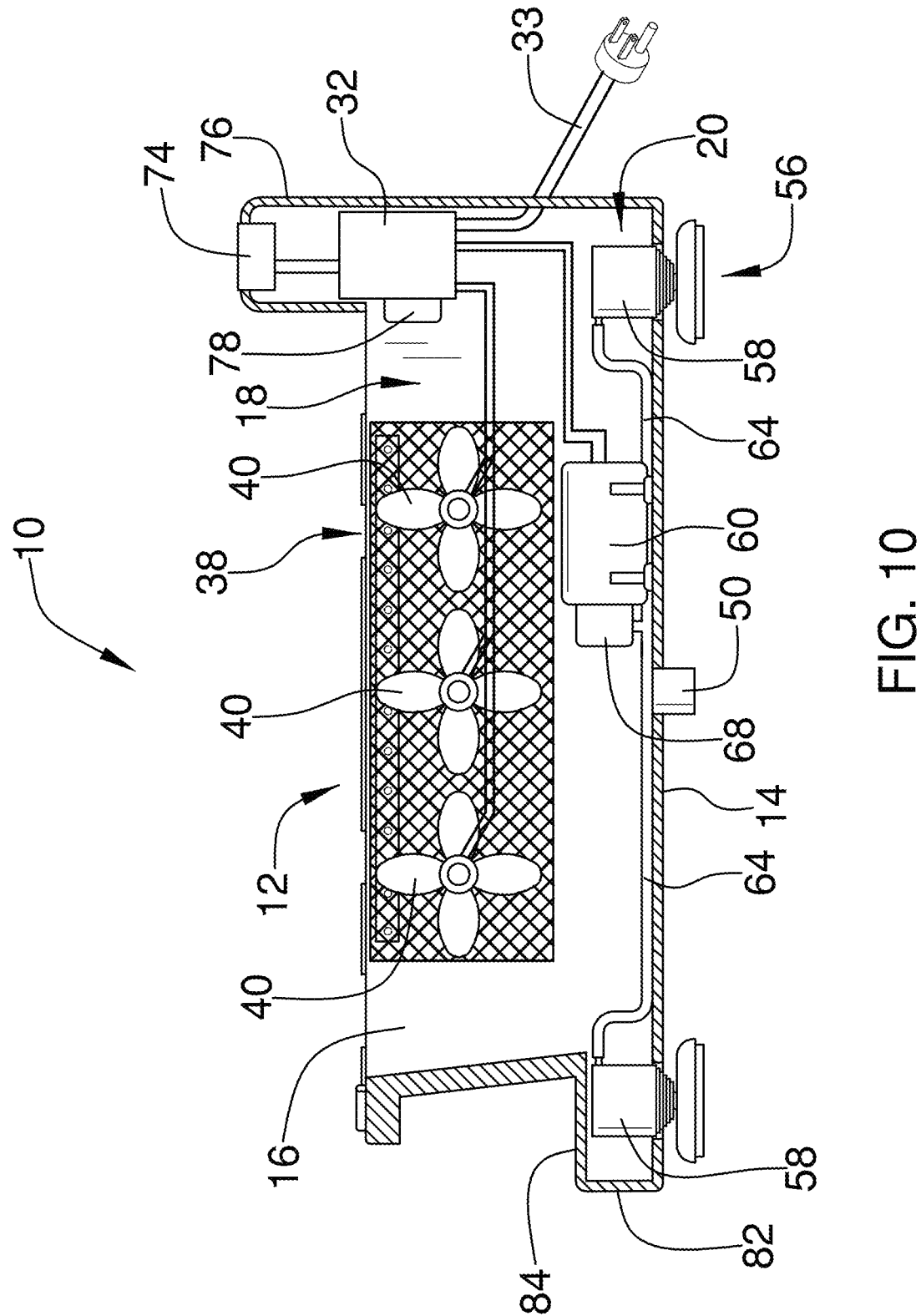
FIG. 10 is a cross-sectional view of an embodiment of the disclosure taken from Line 10-10 in FIG. 2.
Figure 11:
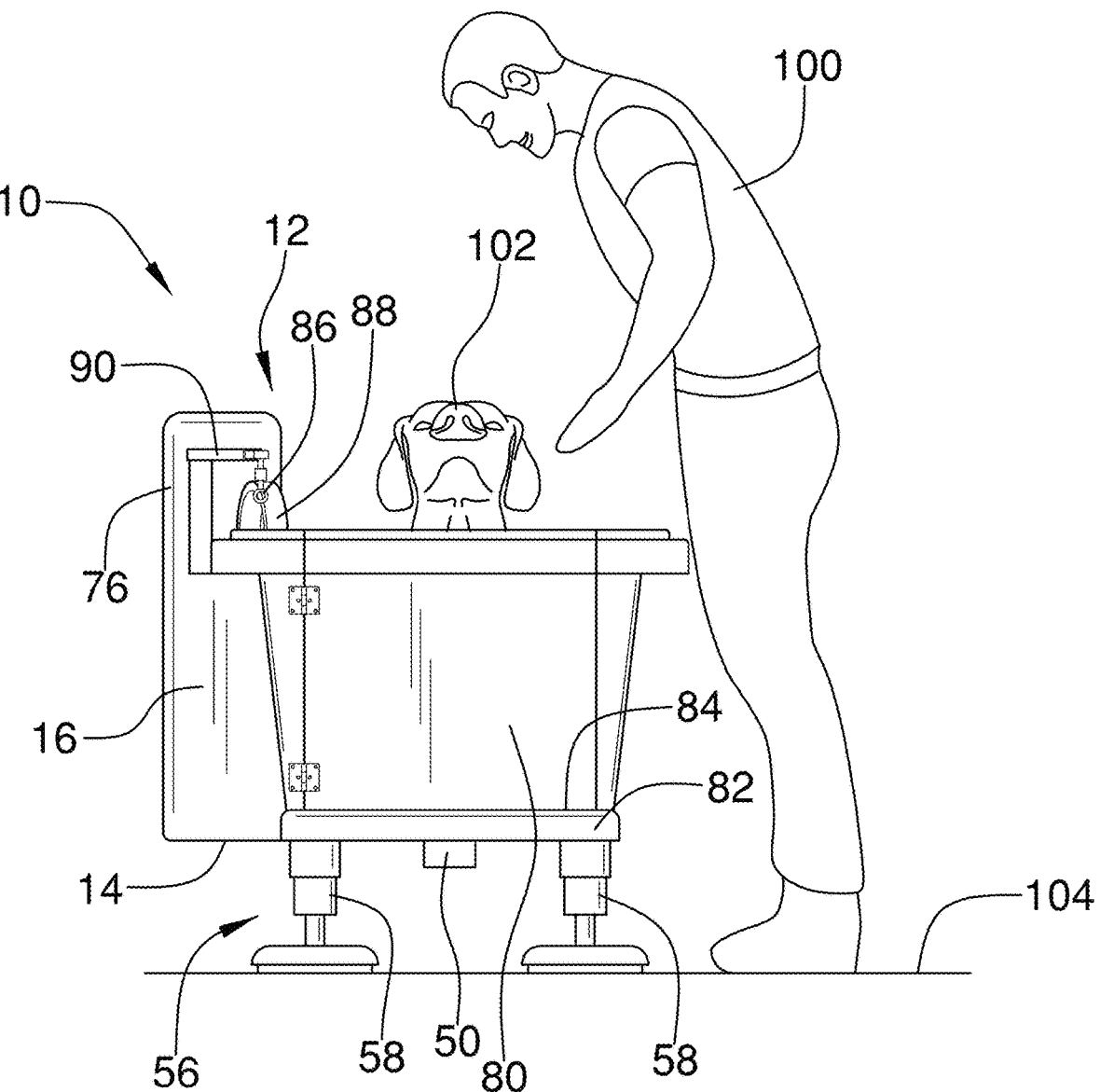
FIG. 11 is a side view of an embodiment of the disclosure during use.
Figure 12:
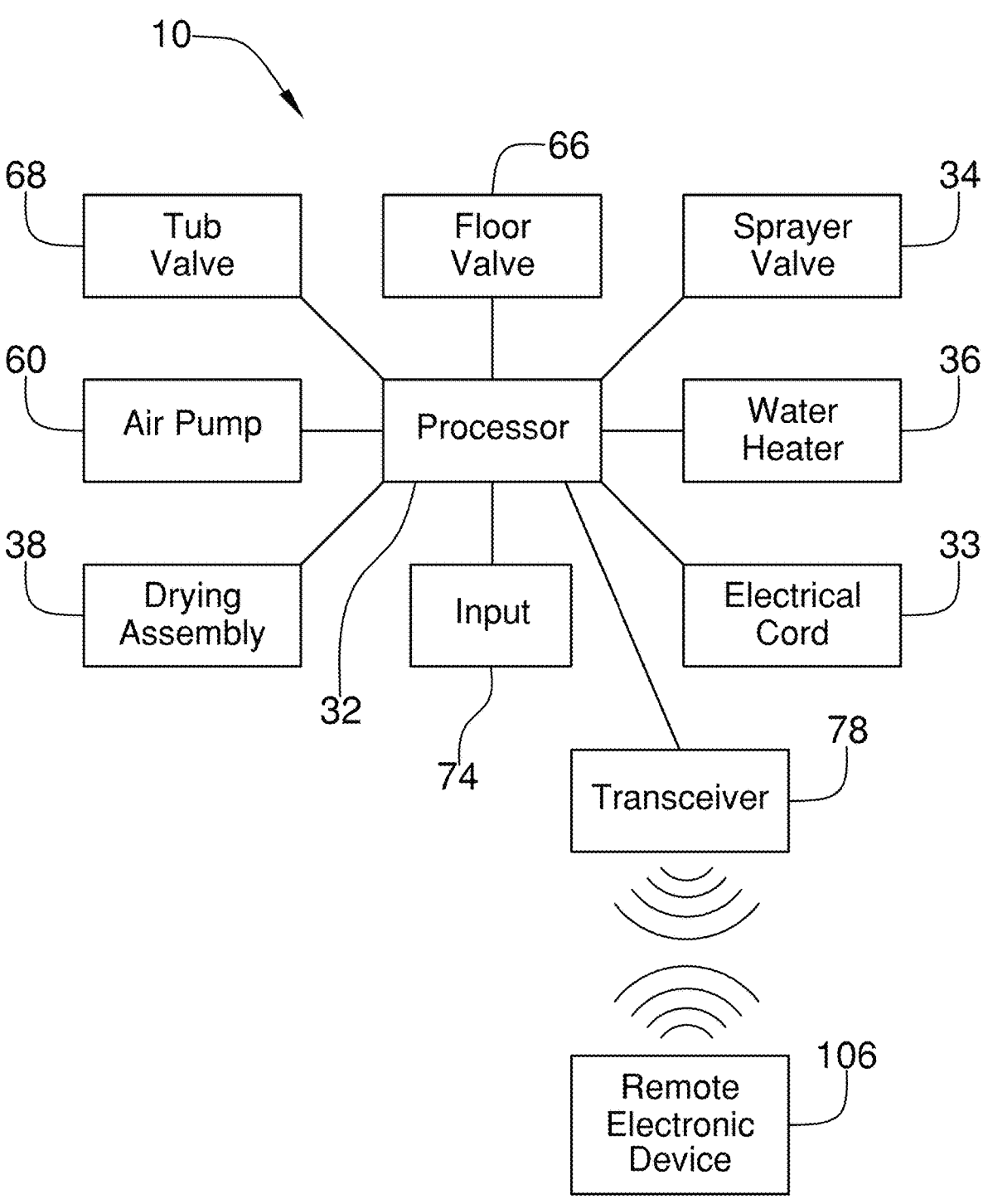
FIG. 12 is a block diagram of an embodiment of the disclosure showing connections to a processor of the disclosure.
Figure 13:
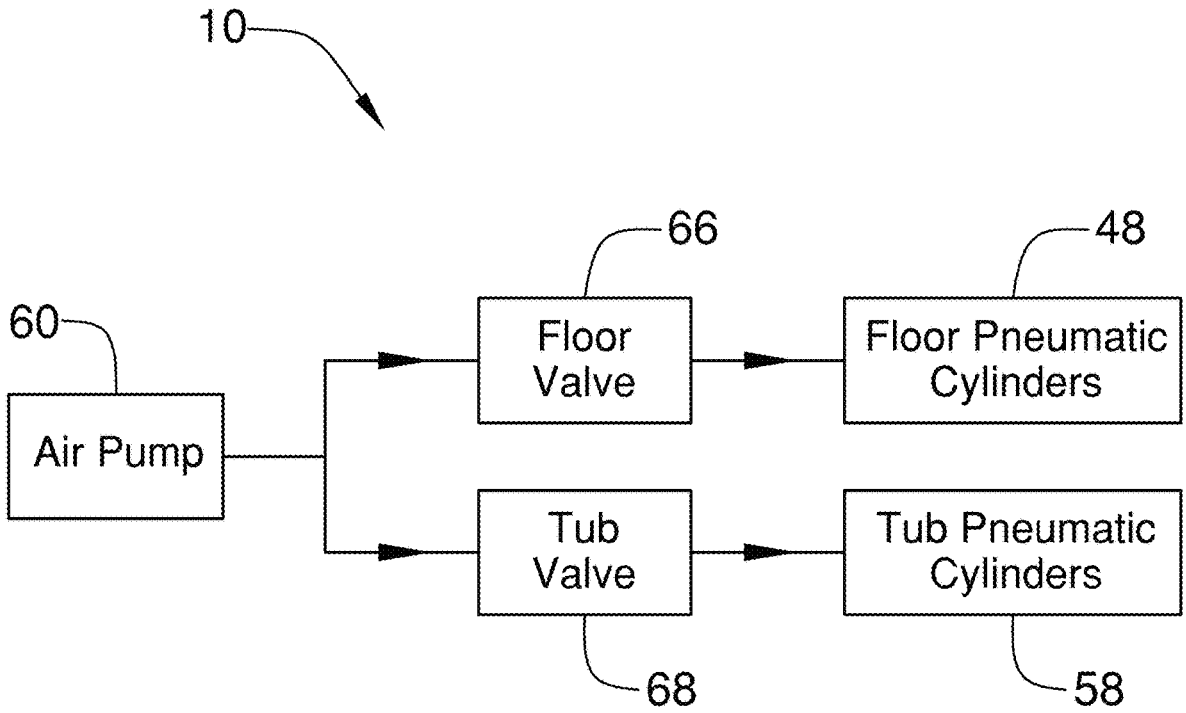
FIG. 13 is a block diagram of an embodiment of the disclosure showing fluid connections for operating components with air.

With reference now to the drawings, and in particular to FIGS. 1 through 13 thereof, a new pet wash apparatus embodying the principles and concepts of an embodiment of the disclosure and generally designated by the reference numeral 10 will be described.

As best illustrated in FIGS. 1 through 6, the pet washing apparatus 10 generally comprises a wash tub 12 which includes a bottom wall 14 and a perimeter wall 16. The perimeter wall 16 is coupled to and extends upwardly from the bottom wall 14. The wash tub 12 defines a basin 18 which is surrounded by the bottom wall 14 and the perimeter wall 16 and has an open top. The wash tub 12 also defines an interior space 20 within the bottom wall 14 and within the perimeter wall 16 for housing various components described below. A top side of the perimeter wall 16 defines a plurality of recesses 22 sized and configured for holding a plurality of grooming tools 24.

The grooming tools 24 may include, for example, a comb, a brush, a deshedding brush, or a pair of gloves such as rubber gloves typically used for washing dishes or other items in hot water. Such gloves may have scrubbing features such as protrusions on the palms made of a flexible material such that the protrusions are able to extend between fur hairs of a pet 102 to facilitate creating a lather while scrubbing the pet 102. The flexible material may, for example, be rubber, silicone, or the like. In some embodiments, a vacuum cleaner for removing loose fur and other material from the pet 102 may be housed in the wash tub 12. A hose for the vacuum cleaner may extend into one of the recesses 22 of the wash tub 12, where a cleaning head of the vacuum cleaner attached to a free end of the hose may rest when the vacuum cleaner is not in use. The cleaning head may incorporate a deshedding brush to facilitate removal of the loose fur.

A spray assembly 26 is mounted to the wash tub 12 on an interior side of the perimeter wall 16 of the wash tub 12. The spray assembly 26 comprises a plurality of nozzles 28. The nozzles 28 are arranged in a row which extends horizontally with respect to the wash tub 12, and each nozzle 28 is oriented to dispense water into the basin 18 of the wash tub 12. A water inlet tube 30 is fluidly coupled to the spray assembly 26 and is configured to fluidly couple to a water supply. The water supply may be external to the wash tub 12 or may be housed by the wash tub 12 in some embodiments.

A processor 32 mounted in the interior space 20 of the wash tub 12. A power cord 33 is electrically coupled to the processor 32 and is configured to electrically couple to an external power source. In other embodiments, a power supply such as a battery may power the processor 32. A water valve 34 and a water heater 36 are housed in the interior space 20 and are mounted to the water inlet tube 30. The water valve 34 is movable to selectively permit water through the water valve 34. The water heater 36 is operable to selectively heat water flowing through the water inlet tube 30. The processor 32 is operatively coupled to the water valve 34 and the water heater 36.

A drying assembly 38 mounted to the wash tub 12 adjacent to the basin 18 of the wash tub 12. The drying assembly 38 comprises a plurality of fans 40. Each fan 40 is positioned in the perimeter wall 16 of the wash tub 12 and is oriented to urge air through apertures in the perimeter wall 16 into the basin 18 when the drying assembly 38 is activated. The drying assembly 38 is operatively coupled to the processor 32. The drying assembly 38 is positioned opposite the spray assembly 26 across the basin 18.

A platform 42 is mounted in the basin 18 of the wash tub 12 and has an upper surface 44 configured for supporting the pet 102. The platform 42 is movable alternately upwardly and downwardly with respect to the wash tub 12 via a floor lift 46. The floor lift 46 comprises a plurality of floor pneumatic cylinders 48. Each floor pneumatic cylinder 48 extends between the bottom wall 14 of the wash tub 12 and the platform 42. Other lifting means may be used for the floor lift 46 such as one or more hydraulic cylinders or other linear actuators. A drain tube 50 is coupled to and extends through the platform 42 and through the bottom wall 14 of the wash tub 12. The drain tube 50 is telescopically extendable and comprises an upper telescopic segment 52 which is mounted to the platform 42 and a lower telescopic segment 54 which is mounted to the bottom wall 14 of the wash tub 12. The upper telescopic segment 52 is slidable with respect to the lower telescopic segment 54 to facilitate draining of water from above the platform 42 to an outlet pipe, a well, or the like.

A tub lift 56 is also coupled to the wash tub 12 and is configured to lift the wash tub 12 with respect to a support surface 104. The tub lift 56 comprises a plurality of tub pneumatic cylinders 58 which is mounted to the wash tub 12. Each tub pneumatic cylinder 58 is extendable downwardly from the wash tub 12 to raise the wash tub 12 above the support surface 104. Other lifting means may be used for the tub lift 56 such as one or more hydraulic cylinders or other linear actuators. An air pump 60 is operatively coupled to the floor lift 46 and the tub lift 56 via floor air tubing 62 and tub air tubing 64 respectively. A floor valve 66 is mounted to the floor air tubing 62 and is movable to selectively permit air to move from the air pump 60 to the floor lift 46. The tub valve 68 is mounted to the tub air tubing 64 and is movable to selectively permit air to move from the air pump 60 to the tub lift 56. The processor 32 is operatively coupled to the air pump 60, the floor valve 66, and the tub valve 68.

The grooming tools 24 may also include one or more spray hoses 70 which may be fluidly coupled to the water supply. Controls 72 for operating each spray hose 70 may be mounted to the wash tub 12 adjacent to the corresponding spray hose 70. The controls 72 may, for example, open a corresponding spray hose 70 valve to permit water from the water supply to flow through the corresponding spray hose 70 or may operate a water pump or other mechanism for directing water through the corresponding spray hose 70. The spray hoses 70 may fluidly couple to the water inlet tube 30 such that water flowing to the spray hoses 70 is heated by the water heater 36 first. The grooming tools 24 may also include a handheld dryer.

An input 74 is operatively coupled to the processor 32 and is configured to receive commands for operating the processor 32. The input 74 is mounted to the wash tub 12 via a post 76 that is integrally formed with the wash tub 12. The post 76 is coupled to and extends upwardly from the perimeter wall 16. The input 74 may comprise a touchscreen, a keypad, or the like and may include a credit card reader or a cash reading device to accept payment for use of the pet washing apparatus 10. A transceiver 78 is also operatively coupled to the processor 32 such that commands may be transmitted to the processor 32 wirelessly via the transceiver 78 from a remote electronic device 106 such as a smartphone, a tablet, or the like using, for example, an application stored on the remote electronic device 106, a webpage accessed by the remote electronic device 106, or the like.

A pair of doors 80 is coupled to the wash tub 12. Each door 80 is movable to selectively access the basin 18 of the wash tub 12 through the perimeter wall 16 of the wash tub 12. Each door 80 of the pair of doors 80 forms a seal with the wash tub 12 when closed to prevent fluid from flowing between the door 80 and the wash tub 12. The doors 80 are positioned opposite each other across the basin 18 of the wash tub 12. A pair of steps 82 is also coupled to the wash tub 12 to facilitate entry and exit of the pet 102 to and from the basin 18. Each step 82 is positioned adjacently below an associated door 80 of the pair of doors 80. Each step 82 of the pair of steps 82 has a top surface 84 which is frictionally enhanced by a rough texture, a material such as rubber or silicone, or the like. The steps 82 may be integrally formed with the wash tub 12.

A leash mount 86 and a harness 88 are coupled via hangers 90 which couple to and extend over the wash tub 12. The leash mount 86 comprises a clip for securing to a leash worn by the pet 102. The harness 88 forms a closed loop which is sized to surround a body of the pet 102.

In some embodiments, a cover is coupled to the wash tub 12 and is movable between a closed position and an open position with respect to the basin 18. The cover may be moved to slide along a track to move between the closed position and the open position. A suitable drive mechanism may be controlled by the processor 32 to move the cover. The processor 32 may be programmed to cause the drive mechanism to close the cover after the pet washing apparatus 10 10 has not been operated by a user 100 for a selected period of time.

In use, the input 74 is operated by the user 100 to command the processor 32 to control several components of the pet washing apparatus 10. The processor 32 may be programmed to open the cover only after a sufficient payment has been made via the input 74. The user 100 may lead the pet 102 into the basin 18 of the wash tub 12 by opening one of the doors 80 and directing the pet 102 onto the adjacent step 82 and into the basin 18 passed the one door 80. The doors 80 may be closed to help contain water and other fluids in the basin 18. A position of the wash tub 12 over the support surface 104 and a position of the platform 42 over the wash tub 12 may be adjusted via the tub lift 56 and the floor lift 46 respectively. The position of the platform 42 may be adjusted, for example, to place the pet 102 such that its leash may be attached to the leash mount 86 or the harness 88 may be attached to the body of the pet 102. The pet 102 may be secured to the wash basin 18 by the harness 88, the leash mount 86, or both. The grooming tools 24 may be used to groom and clean the pet 102. Water may be added to the basin 18 via opening the water valve 34, and the water may be heated via the water heater 36. The drying assembly 38 may be operated to direct air across the pet 102, thereby drying the pet 102.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pet washing apparatus comprising:
   a wash tub comprising a bottom wall and a perimeter wall, the perimeter wall being coupled to and extending upwardly from the bottom wall, the wash tub defining a basin surrounded by the bottom wall and the perimeter wall;
   a spray assembly mounted to the wash tub, the spray assembly being mounted on an interior side of the perimeter wall of the wash tub, the spray assembly comprising a nozzle oriented to dispense water into the basin of the wash tub;
   a water inlet tube fluidly coupled to the spray assembly, the water inlet tube being configured to fluidly couple to a water supply;
   a processor mounted to the wash tub;
   a water valve mounted to the water inlet tube, the water valve being movable to selectively permit water through the water valve, the water valve being operatively coupled to the processor;
   a drying assembly mounted to the wash tub adjacent to the basin of the wash tub, the drying assembly being configured to urge air to flow into the basin of the wash tub when the drying assembly is activated, the drying assembly being operatively coupled to the processor;
   a platform mounted in the basin of the wash tub, the platform having an upper surface configured for supporting a pet, the platform being movable alternately upwardly and downwardly with respect to the wash tub;
   a tub lift coupled to the wash tub and configured to lift the wash tub with respect to a support surface, the tub lift including a tub pneumatic cylinder mounted to the wash tub, the tub pneumatic cylinder being extendable downwardly from the wash tub;
   an air pump operatively coupled to the tub lift, the air pump being operatively coupled to the processor;
   a floor lift coupled to the wash tub and the platform, the floor lift being configured to move the platform alternately upwardly and downwardly with respect to the wash tub, the floor lift comprising a floor pneumatic cylinder which is coupled to and extends between the bottom wall of the wash tub and the platform, the air pump being operatively coupled to the floor lift;
   a floor air tube coupled to and extending between the air pump and the floor lift;
   a floor valve mounted on the floor air tube, the floor valve being movable to selectively permit air to move from the air pump to the floor lift, the floor valve being operatively coupled to the processor;
   a tub air tube coupled to and extending between the air pump and the tub lift; and
   a tub valve mounted on the tub air tube, the tub valve being movable to selectively permit air to move from the air pump to the tub lift, the tub valve being operatively coupled to the processor.

2. The pet washing apparatus of claim 1, wherein a top side of the perimeter wall defines a plurality of recesses sized and configured for holding a plurality of grooming tools.

3. The pet washing apparatus of claim 1, wherein the nozzle is one of a plurality of nozzles of the spray assembly oriented to dispense water into the basin of the wash tub.

4. The pet washing apparatus of claim 1, wherein the drying assembly comprises a plurality of fans, each fan of the plurality of fans being oriented to urge air to flow into the basin of the wash tub when the drying assembly is activated, the drying assembly being positioned on the perimeter wall of the wash tub opposite the spray assembly.

5. The pet washing apparatus of claim 1, further comprising a water heater mounted to the water inlet tube, the water heater being operable to selectively heat water flowing through the water inlet tube, the water heater being operatively coupled to the processor.

6. The pet washing apparatus of claim 1, further comprising a drain tube coupled to and extending through the platform.

7. The pet washing apparatus of claim 6, wherein the drain tube is telescopically extendable, the drain tube comprising an upper telescopic segment which is mounted to the platform and a lower telescopic segment which is mounted to the bottom wall of the wash tub, the upper telescopic segment being slidably coupled to the lower telescopic segment.

8. The pet washing apparatus of claim 1, further comprising an input operatively coupled to the processor and configured to receive commands for operating the processor.

9. The pet washing apparatus of claim 1, further comprising a transceiver operatively coupled to the processor, the processor being configured to wirelessly communicate with a remote electronic device via the transceiver.

10. The pet washing apparatus of claim 1, further comprising a pair of doors coupled to the wash tub, each door of the pair of doors being movable to selectively access the basin of the wash tub through the perimeter wall of the wash tub, each door of the pair of doors forming a seal with the wash tub when closed to prevent fluid from flowing between the door and the wash tub, the pair of doors being positioned opposite each other across the basin of the wash tub.

11. The pet washing apparatus of claim 10, further comprising a pair of steps coupled to the wash tub, each step of the pair of steps being positioned adjacently below an associated door of the pair of doors, each step of the pair of steps having a top surface which is frictionally enhanced.

12. The pet washing apparatus of claim 1, further comprising a leash mount coupled to and spaced above the wash tub, the leash mount comprising a clip for securing to a leash.

13. The pet washing apparatus of claim 1, further comprising a harness coupled to and spaced above the wash tub, the harness forming a closed loop sized and configured to surround a body of a pet.

14. A pet washing apparatus comprising:
a wash tub comprising a bottom wall and a perimeter wall, the perimeter wall being coupled to and extending upwardly from the bottom wall, the wash tub defining a basin surrounded by the bottom wall and the perimeter wall, a top side of the perimeter wall defining a plurality of recesses sized and configured for holding a plurality of grooming tools;
a spray assembly mounted to the wash tub, the spray assembly being mounted on an interior side of the perimeter wall of the wash tub, the spray assembly comprising a plurality of nozzles oriented to dispense water into the basin of the wash tub;
a water inlet tube fluidly coupled to the spray assembly, the water inlet tube being configured to fluidly couple to a water supply;
a processor mounted to the wash tub;
a water valve mounted to the water inlet tube, the water valve being movable to selectively permit water through the water valve, the water valve being operatively coupled to the processor;
a water heater mounted to the water inlet tube, the water heater being operable to selectively heat water flowing through the water inlet tube, the water heater being operatively coupled to the processor;
a drying assembly mounted to the wash tub adjacent to the basin of the wash tub, the drying assembly comprising a plurality of fans, each fan of the plurality of fans being oriented to urge air to flow into the basin of the wash tub when the drying assembly is activated, the drying assembly being operatively coupled to the processor, the drying assembly being positioned on the perimeter wall of the wash tub opposite the spray assembly;
a platform mounted in the basin of the wash tub, the platform having an upper surface configured for supporting a pet, the platform being movable alternately upwardly and downwardly with respect to the wash tub;
a drain tube coupled to and extending through the platform, the drain tube being telescopically extendable, the drain tube comprising an upper telescopic segment which is mounted to the platform and a lower telescopic segment which is mounted to the bottom wall of the wash tub, the upper telescopic segment being slidably coupled to the lower telescopic segment;
a floor lift coupled to the wash tub and the platform, the floor lift being configured to move the platform alternately upwardly and downwardly with respect to the wash tub, the floor lift comprising a plurality of floor pneumatic cylinders which is coupled to and extends between the bottom wall of the wash tub and the platform;
a tub lift coupled to the wash tub and configured to lift the wash tub with respect to a support surface, the tub lift comprising a plurality of tub pneumatic cylinders mounted to the wash tub, the plurality of tub pneumatic cylinders being extendable downwardly from the wash tub;
an air pump operatively coupled to the floor lift and the tub lift, the air pump being operatively coupled to the processor;
a floor air tube coupled to and extending between the air pump and the floor lift;
a floor valve mounted on the floor air tube, the floor valve being movable to selectively permit air to move from the air pump to the floor lift, the floor valve being operatively coupled to the processor;
a tub air tube coupled to and extending between the air pump and the tub lift;
a tub valve mounted on the tub air tube, the tub valve being movable to selectively permit air to move from the air pump to the tub lift, the tub valve being operatively coupled to the processor;
an input operatively coupled to the processor and configured to receive commands for operating the processor, the input being mounted to the wash tub;
a transceiver operatively coupled to the processor, the processor being configured to wirelessly communicate with a remote electronic device via the transceiver;
a pair of doors coupled to the wash tub, each door of the pair of doors being movable to selectively access the basin of the wash tub through the perimeter wall of the wash tub, each door of the pair of doors forming a seal with the wash tub when closed to prevent fluid from flowing between the door and the wash tub, the pair of doors being positioned opposite each other across the basin of the wash tub;
a pair of steps coupled to the wash tub, each step of the pair of steps being positioned adjacently below an associated door of the pair of doors, each step of the pair of steps having a top surface which is frictionally enhanced;

a leash mount coupled to and spaced above the wash tub, the leash mount comprising a clip for securing to a leash; and a harness coupled to and spaced above the wash tub, the harness forming a closed loop sized and configured to surround a body of the pet.

\* \* \* \* \*